United States Patent [19]

Davis

[11] 3,969,264

[45] July 13, 1976

[54] CHOLESTERIC LIQUID CRYSTAL WATER BASE INK

[75] Inventor: Frederick Davis, Dublin, Calif.

[73] Assignee: RPR, Inc., Dublin, Calif.

[22] Filed: Dec. 17, 1973

[21] Appl. No.: 425,006

[52] U.S. Cl............................ 252/299; 23/230 LC; 73/356; 350/160 LC; 428/1
[51] Int. Cl.² ..................... G01K 11/16; C09K 3/34
[58] Field of Search..................... 252/299, 408 LC; 23/230 LC; 73/356; 350/160 LC; 428/1

[56] References Cited
UNITED STATES PATENTS

| | | | |
|---|---|---|---|
| 3,600,060 | 8/1971 | Churchill et al.................... | 252/299 |
| 3,617,374 | 11/1971 | Hudson et al...................... | 252/299 |
| 3,620,889 | 11/1971 | Baltzer.............................. | 252/299 |
| 3,655,971 | 4/1972 | Haas et al........................ | 252/299 |
| 3,669,729 | 6/1972 | Seiner.......................... | 117/161 UA |

FOREIGN PATENTS OR APPLICATIONS 1,161,039  8/1969  United Kingdom................. 252/299

Primary Examiner—Benjamin R. Padgett
Assistant Examiner—T. S. Gron
Attorney, Agent, or Firm—Townsend and Townsend

[57] ABSTRACT

Thin stable, substantially uniform, liquid crystal containing films are provided by coating onto an inert, normally darkened substrate, an ink comprising an oil in water latex, a small amount of an organic solvent, usually a polar moderately water soluble organic solvent, liquid crystals and a thickening agent. The film can be used as an ornamental article of manufacture, for photographic reproduction, for temperature determination, as well as other utilitarian applications.

11 Claims, No Drawings

CHOLESTERIC LIQUID CRYSTAL WATER BASE INK

BACKGROUND OF THE INVENTION

1. Field of the Invention

Cholesteric liquid crystals exhibit brilliant iridescent colors when exposed to various environmental changes such as temperature, pressure, electric fields or contaminants. The response of the liquid crystals can be varied in a variety of ways, including the addition of other materials.

The cholesteric liquid crystals are, for the most part, greasy, buttery substances, which remain soft and difficult to handle and coat. Their use is therefore severely limited, unless means are provided to enhance the ease of handling. Several methods have been developed, which either encapsulate or emulsify the liquid crystals, into a system which is convenient to handle.

The encapsulation technique coats small droplets of liquid crystals with a protective shell, particularly with water soluble polymeric materials. The coating, while protecting the liquid crystals, and enhancing the ease of handling, severely reduces the intensity of the color. The texture and thickness requirements of the encapsulated materials makes mass production difficult, and the encapsulated liquid particles cannot be readily silk screened or printed.

By strongly agitating liquid crystals in a latex, the liquid crystals can be dispersed as small droplets. The percentage of liquid crystals which are capable of handling in this manner is small, and the color of the finished film poor. Furthermore, the emulsion would tend to break down in time, with the liquid crystals floating to the surface.

The various colors which the cholesteric materials undergo in their temperature responsive range are naturally brilliant. However, when the cholesteric materials are combined with other materials or are coated, the colors can undergo substantial dulling. Therefore, it is important when combining the liquid crystal compositions with other materials which serve to fix the liquid crystals to a surface and provide protection for the liquid crystals, that the medium be relatively inert and be clear, as well as capable of bonding to additional films or coatings.

2. Description of the Prior Art

U.S. Pat. Nos. 3,697,297 and 3,732,119 disclose methods of encapsulation of liquid crystals. U.S. Pat. No. 3,600,060 uses water soluble film forming polymers and emulsifies liquid crystals in an aqueous medium. U.S. Pat. No. 3,620,889 incorporates liquid crystals in a clear plastic resin from a solution of the resin in an aromatic hydrocarbon solvent. U.S. Pat. Nos. 3,655,971; 3,663,390 and 3,666,948 use various forms of electromagnetic radiation to form images on films of liquid crystal compositions.

SUMMARY OF THE INVENTION

Liquid crystal formulations are provided of cholesteric liquid crystals in an oil in water latex, modified by the addition of a small amount of an organic solvent and a thickening agent. The composition can be used to form thin stable films, which are less greasy to the touch than liquid crystals, have bright colors in the temperature response range for the crystals and can be readily printed. Preferred latexes are acrylic latexes, although other relatively hard latexes, such as vinylidene chloride or polyvinyl acetate find use. In addition, small amounts of a wetting agent may also be included.

DESCRIPTION OF THE SPECIFIC EMBODIMENTS

Liquid crystal emulsion compositions, derived from combining an oil in water latex emulsion with liquid crytals, a small amount of an organic solvent, normally a polar moderately water soluble organic solvent and a thickening agent, and optionally, a wetting agent, are provided. The resulting compositions are easily coated to a uniform coating of the liquid crystal composition. Foaming and bubble formation during coating, such as silk screening, is minimized, and the resulting film after drying can be readily coated with additional films and provides clear bright colors in the temperature response range of the cholesteric liquid crystals.

The compositions of this invention can be readily prepared by employing commercially available latex compositions. The latex composition may be diluted with water or concentrated to the desired solids content. The latex solution is employed at ambient or moderately elevated temperatures, normally below 40°C.

A second solution is formed which contains the liquid crystal composition. This solution employs the liquid crystal composition, an organic solvent for the liquid crystal composition, normally a moderately water soluble polar solvent, an organic thickening agent, and optionally, a wetting agent.

The weight ratio of the second solution added to the latex solution will normally be in the range of about 0.5 to 2:1. The second solution will have from 20 to 80 weight percent solids, usually 30 to 70 weight percent solids.

The liquid crystal containing mixture is heated to a temperature of at least 40°C and less than about 100°C, usually less than 90°C, and preferably less than about 85°C, providing a substantially homogeneous solution of the liquid crystals. All of the materials present need not be dissolved. The range of choice will generally be about 50°–80°C, depending on the particular composition employed, the boiling point of the organic solvent, and the like. It is found, that the properties of the final composition will vary, depending on the temperature employed. Therefore, to optimize the properties of the final product, some experimentation may be required within the ranges indicated above.

The liquid crystal containing solution is then added to the latex which is conveniently at ambient temperature, with moderate stirring and without further heating. The liquid crystal composition is added slowly and stirring is continued for a short time, usually of the order of 5–30 minutes, although longer times may be employed if desired. Stirring will generally be of the order of 200 to 1,000 rpm.

The resulting composition may now be used for preparing films, for printing, or the like. Various techniques may be used, such as rollers, spraying, draw down blade, silk screening, rotogravure, or the like. The resulting coatings are found to dry rapidly, are substantially free of discontinuities as a result of bubbles, have bright colors in the temperature response range of the liquid crystals, and have only a mildly greasy or non-greasy feel to the touch.

The coating composition of this invention will normally have at least about 30 weight percent solids, and less than about 80 weight percent solids, usually having from about 35–60 weight percent solids and more usually from about 35–50 weight percent solids. Correspondingly, the total liquids will be less than about 70 weight percent and more than about 20 weight percent, usually in the range of 40–65 weight percent, and more usually in the range of 50–65 weight percent. The major portion of the solids content will be from the organic polymer in the latex and the liquid crystal composition. Normally, the liquid crystals will be at least about 25 weight percent and not more than about 75 weight percent of the solids content, usually not more than 65 weight percent, usually being in the range of about 40–65 weight percent, and more usually in the range of about 45–55 weight percent. Correspondingly, the organic polymer will be at least about 25 weight percent and more than about 75 weight percent, usually greater than about 35 weight percent, usually being in the range of about 35–60 weight percent, and more usually in the range of 45–55 weight percent.

For the liquid content, the water will normally be present in at least about 40 weight percent, generally being in the range of about 45–75 weight percent, and more usually in the range of about 50–70 weight percent. Correspondingly, the organic solvent will usually be not more than about 60 weight percent, generally being in the range of about 25–55 weight percent, and more usually in the range of about 30–50 weight percent of the total liquids content.

The remaining material which is present is the thickening agent which is added in sufficient amount to provide a mayonnaise like consistency. The viscosity of the final composition at 20°C will generally be greater than about 1,000 centipoise, usually greater than 1,500 centipoise.

A wide variety of anionic and nonionic latexes may be employed. The latexes are normally derived from organic addition polymers, normally having molecular weights in the range of about $10^4$ to $10^6$ viscosity average molecular weights. The addition polymers may be derived from acrylics, which include acrylic acid, methacrylic acid, their esters, normally alkyl groups of from 1 to 18 carbon atoms as the alkanolic portion, hydroxylated alkyl of from 1 to 6 carbon atoms, e.g. hydroxyethyl, chlorovinyl polymers, e.g. vinyl chloride and vinylidene chloride, vinyl acetate, acrylonitrile, styrene, vinyl pyrrolidone, and the like. Of particular interest are the acrylic latexes, substantially free of monomers other than acrylate and methacrylate esters, vinylidene chloride and up to 30 number percent of one of the other monomers indicated previously. The polymers provide transparent films.

The latexes will generally have from about 5 to 70 weight percent polymer and about 95 to 30 weight percent water, usually 90 to 40 weight percent water.

Various conventional emulsifiers may be present in the latex, such as fatty acid carboxylates, alkylbenzene sulfonates, alkyl phosphates, and the like, as well as nonionic emulsifiers, such as alkylphenyl polyoxyethylenes, polyoxyethylated fatty alcohols, and the like. The amount of emulsifier will generally be from about 0.1 to 5 weight percent of the latex composition.

Non-encapsulated conventional cholesteric liquid crystals will be employed, either individually or in combination. Common cholesteric liquid crystal compounds include cholesteryl chloride, cholesteryl bromide, cholesteryl acetate, cholesteryl oleate, cholesteryl caprylate, cholesteryl oleyl carbonate, and the like. See U.S. Pat. No. 3,600,060 for a description of the cholesteric liquid crystals and a listing thereof, which description is incorporated herein by reference.

The solvents which are employed will generally have a boiling point below about 150°C, preferably below about 120°C, and particularly preferred below about 100°C, and greater than about 50°C. Both polar and non-polar solvents may be employed, with the polar solvents being preferred, and of these solvents, particularly the oxygenated solvents. Various solvents include hydrocarbons, particularly aliphatic hydrocarbons, such as petroleum ether, halohydrocarbons, such as chloroform, nitriles, and oxygenated solvents.

The preferred solvents are polar organic solvents, normally oxygenated, of from 3 to 6 carbon atoms, and from 1 to 2 oxygen atoms. The solvents may be alcohols, ketones, esters, or ethers, preferably of from 4 to 6 carbon atoms, and particularly preferred, methyl ethyl ketone. The oxygenated solvents will normally be soluble in water to at least about 0.5 weight percent at 20°C and while the solvents may be miscible with water, preferred solvents will have a solubility at 20°C of less than about 50 weight percent, more preferably, less than about 40 weight percent. Illustrative oxygenated solvents include isobutanol, methyl ethyl ketone, ethyl acetate, methyl isobutyl ketone, and the like. A sufficient amount of solvent is employed to insure the complete dissolution of the liquid crystal composition.

The thickening agent may be varied widely and is normally employed in a sufficient amount to insure the desired consistency of the composition for use in coating or film forming. The thickening agent will normally be present in at least about 0.1 weight percent, usually at least about 0.2 weight percent and not more than about 2 weight percent, more usually from about 0.5 to 1.5 weight percent of the total coating composition. Various thickening agents can be employed, such as the carboxylvinyl polymers, sold as Carbopol resins by B. F. Goodrich Chemical Co., e.g. Carbopols 934, 940, 941, 960 and 961, salts of carboxymethylcellulose, e.g. sodium, polyethylene oxides, alkyl (1 to 3 carbon atoms) and hydroxylalkyl (2 to 3 carbon atoms) cellulose, e.g. methyl cellulose and hydroxyethyl cellulose, 2-aminomethylpropanol, and the like. Of particular interest are the Carbopol mucilages, which are the carboxyvinyl polymers and the cellulose thickeners.

Wetting agents may also be included in minor amounts, particularly nonionic or anionic emulsifiers. The nonionic emulsifiers are primarily ethylene oxide and propylene oxide polymers where the end groups may be esterified or etherified. Various series of nonionic wetting agents are available under the name Emulphor, Triton, and the like. Other wetting agents include polyols, e.g. 2,4,7,9-tetramethyl-5-decyn-4,7-diol(Surfynol 104, sold by Air Products and Chemical Co.).

The wetting agent will normally be employed in small amounts, generally being present in from about 0.1 to 2 weight percent of the total composition, more usually of from about 0.2 to 1 weight percent of the total composition. Since the wetting agent will be in addition to the emulsifier employed for the latex, the total amount of emulsifier may range up to about 4 weight percent of the total composition.

In addition to the materials normally employed in the composition, other materials may also be included. These materials include fillers, such as silica gel and carbon black, stabilizers, foam suppressants, antioxidants, and the like. Fillers will normally be present in from 0.5 to 5 weight percent, more usually from 1 to 3 weight percent of the total composition, while the minor additives may be present in as small an amount as 0.001 weight percent and usually not more than 1 weight percent of the total composition.

compositions prepared and the observations made concerning these films.

| Latex[1] | H₂O | Liquid[2] Crystals | Methyl Ethyl Ketone | Thickening[3] Agent | | Wetting[4] Agent | | Film Thickness | Film[5] Forming Method | Composition[6] Viscosity | Color[6] | Greasiness[6] | Other[7] |
|---|---|---|---|---|---|---|---|---|---|---|---|---|---|
| | g* | g | g | g | g | | g | mil | | | | | |
| AC-61 | 40 | — | 16 | 12 | QP | .125 | E | 0.7 | 5 | DD | G | G | G | |
| AC-61 | 20 | 30 | 30 | 10 | QP | 0.4–0.8 | E | 1 | 1–2 | DD | G | G | G | |
| AC-61 | 16 | 24 | 20 | 20 | C961 | 0.4 | — | | 1–2 | SS | G | G | G | |
| AC-61 | 30 | 20 | 20 | 20 | C961 G110 | 0.5 | — | | 1–2 | SS | G | G | G | |
| AC-73 | 24 | 16.5 | 20 | 20 | C961 | 0.4 | E | 0.5 | 1–2 | DD | | G | G | melted |
| XD7506 | 24 | 16 | 20 | 20 | C961 | 0.4 | E | 0.4 | 1–2 | DD | G | VG | F | |
| LC-40 | 24 | 16 | 20 | 20 | C961 | 0.4 | E | 0.4 | 1–2 | DD | G | G | F | |
| N-495 | 24 | 16 | 20 | 20 | C961 | 0.4 | E | 0.4 | 1–2 | DD | G | VG | P | |
| HA-16 | 24 | 16 | 20 | 20 | C961 | 0.4 | E | 0.4 | 1–2 | DD | G | G | G | melted |
| E801N | 24 | 16 | 20 | 20 | C961 | 0.4 | E | 0.4 | 1–2 | DD | G | E | P | |

*Approximately 50 weight % solids

1. AC-61    Anionic Acrylic Polymer Emulsion 46.5 weight % solids; sp. gr. 20°C 1.13 vis. 20–135 cps; 25°C., No. 1 Spindle 30 rpm. Brookfield viscometer; supplied by Rohm & Haas Co., Phila., Pa.
   AC-73    Nonionic Acrylic Polymer (hard) Emulsion Rohm & Haas Co.
   XD7506    Polyvinylidene Chloride Emulsion (High barrier) Dow Chemical Co.
   LC-40    Anionic Acrylic Polymer Emulsion Rohm & Haas Co.
   N-495    Anionic Acrylic Ester Copolymer Emulsion Rohm & Haas Co.
   HA-16    Nonionic Self Cross-linking Acrylic Polymer Emulsion, Rohm & Haas Co.
   E801N    Nonionic Acrylic/Vinylidene Chloride Copolymer Emulsion, Rohm & Haas Co.
2. An exemplary composition which was employed was:
   wt %
   40    cholesteryl oleyl carbonate
   20    cholesteryl benzoate
   40    cholesteryl nonanoate
3. Qp-    QP 52,000 - Cellusize, Hydroxyethyl cellulose Union Carbide and Chemical Co.
   C961-    Carbopol 961, Carboxyvinyl Polymer B. F. Goodrich Chem. Co.
   G-110-    Ammonium polyacrylate, 22 wt. % solids
4. E-    Emulphor ON870 Polyoxyethylated fatty alcohol Air Products & Chem. Co.
5. DD-    draw down knife blade
   SS-    silk screen
6. The films were subjectively graded by visual and tactual appearance. P-poor; F-fair; G-good; VG-very good; E-excellent
7. Color was improved by heating the liquid crystals above their melting temperatures.

Experimental (All temperatures not otherwise indicated are in centigrade).

The following examples are offered by way of illustration and not by way of limitation.

A general method was employed for preparing the subject compositions. A commercially available latex was diluted with water to the desired solids content. In a separate container was introduced a polar organic solvent, a liquid crystal composition, a thickening agent and when employed, the wetting agent. The liquid crystal composition was then heated to an elevated temperature, 50°–70°C, and added slowly with stirring to the latex solution. Stirring was continued for at least 5 minutes after the addition of the liquid crystal composition to the latex, the stirring stopped, and the composition was ready for use, having a thick mayonnaise like consistency.

The composition was then drawn down with a knife blade or silk screened to give a thin dry film upon evaporation of the liquid, having a thickness of about 1–5 mils. After drying, the film was visually inspected for its appearance, touched to determine its greasy character, and warmed to the temperature response range of the liquid crystals to determine the appearance of the liquid crystals. The following table indicates the various compositions prepared and the observations made concerning these films.

In addition to the latex compositions employed in the foregoing table, other latex compositions have been tested and found to be effective. These include acrylic polymer emulsions supplied by Rohm & Haas Company under the trade designation Rhoplex AC-33, AC-35, E358, HA-24 and E-516. Among polyvinylidene chloride polymers, supplied by Dow Chemical Co., XD-7151 and XD-8296 have been employed. Vinylchloride-vinylidene chloride copolymers, supplied by B. F. Goodrich Chemical Co. include Geon 652 and 352 as well as 460 Xl. A vinyl acrylic polymer supplied by Borden Chemical Co. under the designation Polyco Z-190 has also been employed.

Other wetting agents which have been effectively employed include Triton X-100, an octylphenoxypolyethoxyethanol, supplied by Rohm & Haas Co., dioctyl sodium sulfosuccinate, supplied by Rohm & Haas Co., under the trademark GR7 and Surfynol 104, supplied by Air Products & Chemical Co.

Other thickening agents include Vinol 205, supplied by Air Products & Chemical Co., Thickener L supplied by General Aniline and Film Co. and 2-aminomethylpropanol.

The compositions of this invention provide thin, stable films having bright intense colors of excellent uniformity. The liquid crystals are fixed in position, so that patterns created in the liquid crystal compositions are not lost due to migration. For the most part, a substantial reduction of greasiness from the original liquid crystal composition is achieved, so that coating of the liquid crystal compositions is greatly facilitated. In addition, the compositions are easily coated by a wide variety of techniques without significant bubble formation or discontinuity in the film. The film may be laid down on a wide variety of substrates, including Mylar, polyolefins, e.g. polyethylene and polypropylene, and the like. In addition, high ratios of the liquid crystal composition can be employed in combination with the polymeric binder, so that relatively intense or intense colors can be achieved with very thin films, due to the high proportion of the liquid crystal compositions.

The films which are prepared will generally have thicknesses of about from 0.005 to 20 mils, more usually from about 0.5 to 10 mils. The films can be prepared as continuous films on a substrate, normally darkened substrate, or can be printed on the substrate in various designs or alpha-numeric symbols.

The film of liquid crystal composition will normally be coated with one or more additional protective coatings. A wide variety of different materials may be used, which are inert and transparent. The latexes which are employed in combination with the liquid crystals provide a convenient film-forming composition to provide the additional coatings. Either the same or different latex may be employed, as was employed with the liquid crystal composition. The thickness of the additional coating may be as thin as 0.5 mil and will generally not be thicker than 20 mils, usually being in the range of about 1 to 10 mils.

The films have a wide variety of ornamental and utilitarian uses. They can be used for measuring temperatures, both as an indication of temperature, or as warning devices. In addition, because of deterioration of the cholesteric material by irradiation, photographs can be reproduced by irradiating through a negative onto the film. Those areas exposed to the irradiation will undergo a change in the temperature response range. Upon the film being warmed to the temperature response range, the photograph is reproduced so as to be visible. Since the liquid crystals cannot migrate, the photograph is stable for long periods of time.

Although the foregoing invention has been described in some detail by way of illustration and example for purposes of clarity of understanding, it will be obvious that certain changes and modifications may be practiced within the scope of the appended claims.

What is claimed is:

1. A composition useful in the formation of liquid crystal films which comprises:
    a thick oil in water emulsion having from 30 to 80 weight percent solids of which 25-75 weight percent is a cholesteric liquid crystal composition and 75-25 weight percent respectively is a transparent latex film-forming polymer;
    from 20-70 weight percent liquid, having water in from 40-75 weight percent and a moderately water soluble organic solvent having a boiling point less than about 150°C for said liquid crystal composition in from 25-60 weight percent; and
    a small but sufficient amount of a thickening agent to provide the desired viscosity for film forming.

2. A composition according to claim 1, wherein said solids content is in the range of 35-60 weight percent, said liquid crystal composition is present in from 40-65 weight percent of said solids content, said polymer is present in from 35-60 weight percent respectively; said liquid content is present in from 40-65 weight percent, with water present in from 45-75 weight percent and organic solvent present in from 25-55 weight percent of said liquid content; said thickener is present in from 0.1 to 2 weight percent, and including from 0.1 to 2 weight percent of a wetting agent.

3. A composition according to claim 2, wherein said polymer is an acrylic polymer, said solvent is an oxygenated solvent of from 3 to 6 carbon atoms, and said wetting agent is a nonionic emulsifier.

4. A composition according to claim 2, wherein said polymer is a chlorovinyl polymer, said solvent is an oxygenated solvent of from 3 to 6 carbon atoms, and said wetting agent is a nonionic emulsifier.

5. A liquid crystal composition for forming films of liquid crystals which is a thick oil in water emulsion comprising:
    35-60 weight percent solids, of which 45-55 weight percent is a cholesteric liquid crystal composition and 45-55 weight percent is a transparent acrylic latex film-forming polymer;
    40-65 weight percent liquid of which 50-70 weight percent is water and 30-50 weight percent is methyl ethyl ketone; and
    0.5 to 1.5 weight percent of the total composition of a carboxyvinyl polymeric thickening agent.

6. A composition according to claim 5, having from 0.2 to 4 weight percent of the total composition of a nonionic emulsifier.

7. A method for forming a film-forming liquid crystal composition containing emulsion which comprises:
    adding to a latex of a transparent film-forming polymer having from about 30-95 weight percent water, a solution of a cholesteric liquid crystal composition in a moderately water soluble organic solvent having a boiling point less than about 150°C, said solution having a sufficient amount of a thickening agent to provide a final concentration of from about 0.1 to 2 weight percent of the total composition, said liquid crystal composition being present in amount to provide from about 25-75 weight percent of the total solids content, wherein said solution is at a temperature in the range of about 40°-100°C, and stirring the resulting mixture for a time sufficient to provide a substantially uniform composition.

8. A method according to claim 7, wherein said solvent is present in an amount sufficient to provide 30-50 weight percent of the total liquid and said liquid crystal composition is present in an amount sufficient to provide from 45-55 weight percent of the total liquid and 9. A method according to claim 8, wherein said latex is an acrylic latex and said solvent is an oxygenated solvent of from 3 to 6 carbon atoms.

10. A method according to claim 8, wherein said latex is a chlorovinyl polymer latex and said solvent is an oxygenated solvent of from 3 to 6 carbon atoms.

11. A method according to claim 8, wherein included in said liquid crystal solution is a nonionic emulsifier in an amount sufficient to provide 0.1 to 2 weight percent of the final composition.

* * * * *